United States Patent [19]

Ohnuma et al.

[11] Patent Number: 5,381,255
[45] Date of Patent: Jan. 10, 1995

[54] FERROELECTRIC LIQUID CRYSTAL DISPLAY WITH SEAL LARGER THAN CELL GAP PLUS HALF COLOR FILTER THICKNESS AND 1.2–5MM FROM FILTER EDGE

[75] Inventors: Kenji Ohnuma, Isehara; Masaaki Suzuki; Keishi Danjoh, both of Yokohama, all of Japan

[73] Assignee: Canon Kabushiki Kaisha, Tokyo, Japan

[21] Appl. No.: 174,171

[22] Filed: Dec. 29, 1993

Related U.S. Application Data

[63] Continuation of Ser. No. 752,277, Aug. 28, 1991, abandoned.

[30] Foreign Application Priority Data

| Aug. 30, 1990 | [JP] | Japan | 2-226589 |
| Oct. 22, 1990 | [JP] | Japan | 2-285260 |
| Aug. 23, 1991 | [JP] | Japan | 3-235645 |

[51] Int. Cl.$^6$ ............ G02F 1/1335; G02F 1/1339
[52] U.S. Cl. ............ 359/68; 359/80; 359/81
[58] Field of Search ............ 359/81, 68, 80

[56] References Cited

U.S. PATENT DOCUMENTS 5,079,214 1/1992 Long et al. .......................... 359/68

FOREIGN PATENT DOCUMENTS

| 0288304 | 10/1988 | European Pat. Off. | 359/81 |
| 0010616 | 4/1989 | Japan | 359/81 |
| 0170131 | 6/1990 | Japan | 359/81 |
| 0062019 | 3/1991 | Japan | 359/81 |

*Primary Examiner*—Anita Pellman Gross
*Attorney, Agent, or Firm*—Fitzpatrick, Cella, Harper & Scinto

[57] ABSTRACT

There is disclosed a ferroelectric liquid crystal color-display panel capable of preventing defects in liquid crystal orientation, resulting from the glass substrate bending, particularly in the end portion of effective display area, by the use of a gap-retaining material, such as silica or alumina beads, in the sealant of the panel, wherein the diameter T of the gap retaining material satisfies a relation:

$$t_1 + (t_2/2) \leq t$$

in which $t_1$ is the cell gap in the display area and $t_2$ is the thickness of color filter provided in the display area.

7 Claims, 4 Drawing Sheets

FERROELECTRIC LIQUID CRYSTAL DISPLAY WITH SEAL LARGER THAN CELL GAP PLUS HALF COLOR FILTER THICKNESS AND 1.2–5MM FROM FILTER EDGE

This application is a continuation of application Ser. No. 07/752,277, filed Aug. 28, 1991, now abandoned.

BACKGROUND OF THE INVENTION

1. Field of the Invention

The present invention relates to a ferroelectric liquid crystal color-display device, and more particularly to such display device capable of cell gap compensation particularly in the peripheral area.

2. Related Background Art

For use in a liquid crystal display device, there is already known a dyed color filter obtained by forming a matrix layer of a hydrophilic substance such as gelatin, casein or polyvinyl alcohol on a substrate and dyeing said matrix layer with suitable dyes.

Such dyeing method can relatively easily satisfy the spectral characteristics required for the color filter because of a large number of usable dyes, but it is associated with a low production yield because it employs a poorly controllable wet process, for dyeing the matrix layer, by immersing said matrix layer in a dyeing bath containing the dye, and also because it involves complex process steps of forming a dye-preventive intermediate layer for each color. Also this method is not adequate in case the filter is subjected to a thermal treatment because the thermal stability of the usable dyes is relatively low and is generally limited to 150° C. or lower, and the matrix layer itself lacks the reliability in thermal and light resistances.

On the other hand, there is also known a color filter employing colored resin, composed of certain coloring substances dispersed in transparent resin.

For example, in a color filter employing colored resin films composed of polyamide resin containing coloring substances, such as disclosed in the Japanese Laid-Open Patents Sho 58-46325, Sho 60-78401, Sho 60-184202, Sho 60-184203, Sho 60-184204 and Sho 60-184205, the polyamide resin itself has excellent heat and light resistances, but the formation of pattern of the color filter has to rely on a printing process which is inadequate for fine pattern, or a complex process of forming a photoresist mask on the colored resin film and etching said film through said mask, because said resin is non-photosensitive.

On the other hand, a color filter employing color resin films containing coloring substances in photosensitive resin, as disclosed in the Japanese Laid-Open Patents Sho 57-16407, Sho 57-74707 and Sho 60-129707, can simplify the process as fine patterns of the color filter can be formed by ordinary photolithographic steps.

However, in the preparation of a color filter with such colored resins containing coloring substances in the photosensitive resin, the exposure energy required for photohardening of said photosensitive resin becomes considerably larger than in the usual cases, because such coloring substances generally have light absorption in the exposure wavelength region.

In general, the exposure light intensity in photosensitive resin decreases exponentially with the depth from the surface receiving the exposing light. Presence of the light-absorbing coloring substance in the photosensitive resin enhances the attenuation of exposing light intensity with the depth, thus eventually causing insufficient photo-hardening of the photosensitive colored resin film at the bottom thereof, namely at the interface with the substrate, and resulting peeling of said film at the pattern development.

On the other hand, an increase of the exposure energy for compensating the attenuation of the exposing light energy may lead to deterioration of the colored resin itself.

Also the presence of the coloring substance in the colored resin film induces surface coarseness thereof, which not only causes light scattering on the surface of the color filter, thereby deteriorating the optical performance thereof, but also may disturb the orientation of the liquid crystal molecules in case said color filter is positioned on the internal surface of the liquid crystal display device.

As explained above, the formation of a color filter with colored resin containing coloring substances in photosensitive resin still involves drawbacks in the stability and durability of the color filter films in the process of formation thereof and in the performance of the obtained color filter.

In order to overcome the above-mentioned drawbacks, the present applicant already proposed, in the Japanese Patent Application sho 62-22461 (Japanese Laid-Open Patent Sho 63-191104), a color filter which enables effective pattern formation with a reduced exposure energy, prevents the deterioration of the colored material at the exposure, reduces the difference in photo-hardening in the direction of depth of the film, and provides a smoother surface on the colored resin film. This color filter is provided with plural patterned and colored resin layers which are formed by employing colored resin containing at least coloring substance in photosensitive resin and by repeating photolithographic steps, wherein the amount of dispersed coloring substance is gradually increased from the surface to the bottom of the colored resin layer.

A liquid crystal color-display panel is formed by positioning, in mutually opposed relationship, a substrate which bears thereon a color filter, formed by one of the above-mentioned methods, and a protective passivation layer and on which pixel units are formed by surface electrodes and metal lead electrodes, and another substrate on which pixel units are formed by surface electrodes and metal lead electrodes. For obtaining a uniform cell gap in such display panel, there is principally employed a method of scattering gap-retaining material in the area of pixel units and printing sealant, with gap-retaining material of a same diameter, in the peripheral area of the substrate, before both substrates are mutually adhered.

Also for obtaining a more uniform cell gap, there is known a method of forming the color filter not only in the pixel area but also in the peripheral area and providing the gap-retaining material of a same diameter in both areas.

The cell gap of the color display panel employing ferroelectric liquid crystal is as small as 1–2 $\mu$m, which is significantly smaller than that of the display panels employing super-twisted nematic or other liquid crystal, and has to be maintained at a uniformity of 0.05–0.30 $\mu$m. However, in the above-mentioned first conventional structure employing the gap-retaining material in the pixel area and the gap-retaining material of a same diameter mixed in the sealant printed in the peripheral area, the glass substrates may generate significant bending between the sealed peripheral area and the pixel area. Particularly, in the end portions of the pixel area, the liquid crystal layer becomes thinner than in the central portion, whereby the chevron structure of liquid crystal molecules constituting the oriented state may be destructed and the orientation of said molecules may be disrupted.

On the other hand, in the above-mentioned latter conventional structure, in which the color filter is extended to the peripheral area and the gap-retaining material of a same diameter is provided both in the pixel and peripheral areas, the sealant printed on the color filter may show insufficient adhesion, because of the relatively poor adhesive character of the color filter, whereby the mutual alignment of the substrates, to be maintained by said sealant, may become difficult to maintain.

SUMMARY OF THE INVENTION

The present invention, attained for resolving the above-mentioned drawbacks of the prior technology, has its objective to provide a ferroelectric liquid crystal color-display panel capable of maintaining a uniform cell gap at least over the entire effective display area, including the end portions of the pixel area, thereby preventing disruption in the orientation of liquid crystal molecules in the end portions of the pixel area and providing a sharp image in the peripheral area of the panel as well as in the central area.

The above-mentioned objective can be attained, according to the present invention, by a ferroelectric liquid crystal color-display panel, composed of a substrate which bears thereon a color filter formed by colored resin at least containing coloring substances in photosensitive resin and on which an area of pixel units is formed by surface electrodes and metal lead electrodes formed on said color filter, and another substrate on which an area of pixel units is formed by the other surface electrodes and metal lead electrodes formed thereon, said substrates being mutually adhered so as to form different cell gaps in the pixel area and in the peripheral area, wherein the diameter T of the gap-retaining material contained in the sealant provided in the peripheral area satisfies a relation:

$$t_1 + (t_2/2) \leq T$$

in which $t_1$ is the cell gap in the pixel area and $t_2$ is the thickness of said color filter.

DETAILED DESCRIPTION OF THE PREFERRED EMBODIMENTS

Figure 1:
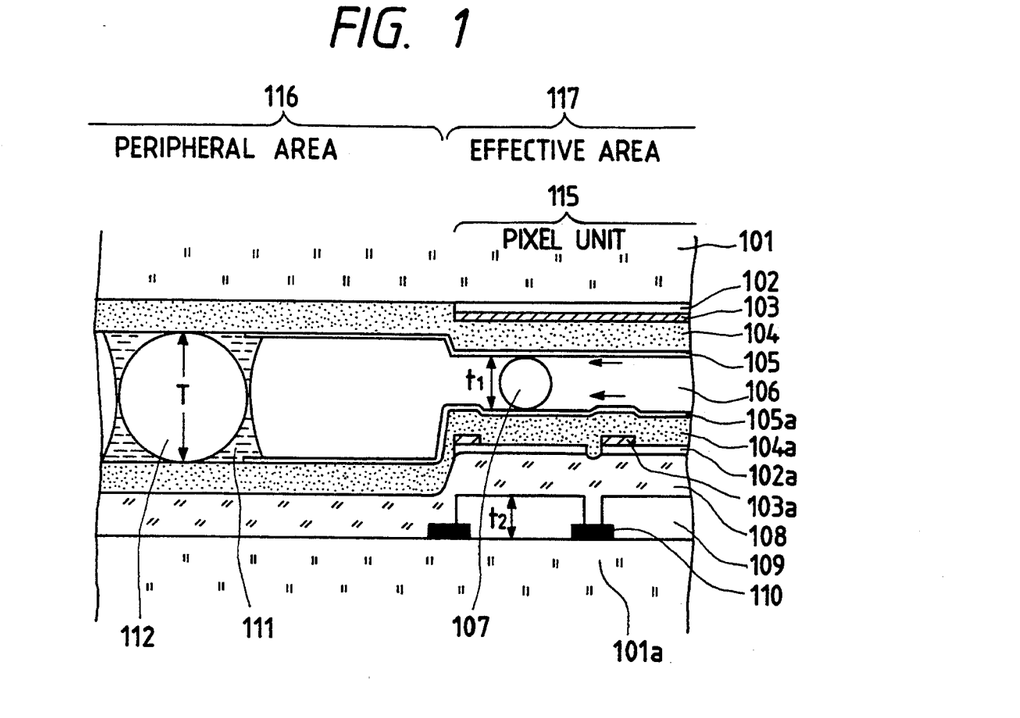
FIG. 1 is a schematic partial cross-sectional view of a first embodiment of the ferroelectric liquid crystal color-display panel of the present invention.

FIG. 1 is a schematic cross-sectional view of an embodiment of the ferroelectric liquid crystal color-display device of the present invention.

Substrates (glass plates) 101, 101a are respectively provided thereon with transparent electrodes 102, 102a composed for example of $In_2O_3$ or ITO (indium tin oxide), insulation layers 104, 104a of a thickness of 200–3000 Å composed for example of $SiO_2$, $TiO_2$ or $Ta_2O_5$, and orienting films 105, 105a of a thickness of 50–1000 Å. Said orienting films 105, 105a are subjected to a rubbing treatment in such a manner that the orienting directions thereof are mutually parallel and are in a same direction indicated by arrows. The substrates 101, 101a sandwich therebetween ferroelectric smectic liquid crystal 106, and are maintained at a mutual distance small enough for suppressing the formation of spiral structure of said ferroelectric smectic liquid crystal, for example 0.1 to 3 μm, whereby said liquid crystal is bistably oriented. The sufficiently small distance mentioned above is maintained by gap-retaining materials 107, 112 (silica beads or alumina beads) positioned between the substrates 101 and 101a.

The orienting films 105, 105a adapted for use in the present invention can be formed from an inorganic insulating material such as silicon monoxide, silicon dioxide, aluminum oxide, zirconia, magnesium fluoride, cellium oxide, cellium fluoride, silicon nitride, silicon carbide or boron nitride, or an organic insulating material such as polyvinyl alcohol, polyimide, polyamidimide, polyesterimide, polyparaxylilene, polyester, polycarbonate, polyvinyl acetal, polyvinyl chloride, polyamide, polystyrene, cellulose resin, melamine resin, urea resin or acrylic resin. The film of the above-mentioned inorganic insulating material can also serve as a short-circuit-preventing insulation film.

Said orienting films 105, 105a, after film formation with the inorganic or organic insulating material mentioned above, are given a monodirectional orienting axis by rubbing of the surfaces thereof with velvet, cloth or paper.

The insulation layers 104, 104a have a thickness of 200 Å or larger, preferably 500 Å or larger, and are obtained by film formation with an inorganic insulating material such as $SiO_2$, $TiO_2$, $Al_2O_3$, $Si_3N_4$ or $BaTiO_3$. The film formation can be achieved by sputtering, ion beam evaporation, or sintering of a coated film of an organic titanium compound, an organic silane compound or an organic aluminum compound. Said organic titanium compound can be an alkyl titanate such as methyl, ethyl, propyl or butyl titanate, and said organic silane compound can be an ordinary silane coupling agent. The insulation layers 104, 104a with a thickness less than 200 Å are unable to provide sufficient effect for prevention of shortcircuiting. Also a thickness in excess of 5000 Å prevents the liquid crystal layer from application of effective voltage, so that said thickness is selected at 5000 Å or less, preferably 2000 Å or less.

The liquid crystal particularly adapted for use in the present invention is chiral smectic liquid crystal with ferroelectric property. More specifically there can be employed liquid crystal of chiral smectic C-phase (SmC*), chiral smectic G-phase (SmG*), chiral smectic F-phase (SmF*), chiral smectic I-phase (SmI*) or chiral smectic H-phase (SmH*).

The details of ferroelectric liquid crystal are disclosed for example in Le Journal de Physique Letters 36, (L-69) 1975, "Ferroelectric Liquid Crystals"; Applied Physics Letters 36 (11) 1980 "Submicro Second Bistable Electrooptic Switching in Liquid Crystals"; Kotai Buturi 16 (141) 1981 "Liquid Crystals"; the U.S. Pat. Nos. 4,561,726, 4,589,996, 4,592,858, 4,596,667, 4,613,209, 4,614,609 and 4,622,165, and the liquid crystals described in these references may be employed in the present invention.

Examples of such ferroelectric liquid crystal compound include desiloxybenzylidene-p'-amino-2-methylbutyl cinnamate (DOBAMBC), hexyloxybenzylidene-p'-amino-2-chloropropyl cinnamate (HOBACPC) and 4-o-(2-methyl)-butylresorcilidene-4'- octylaniline (MBR8).

Figure 5:
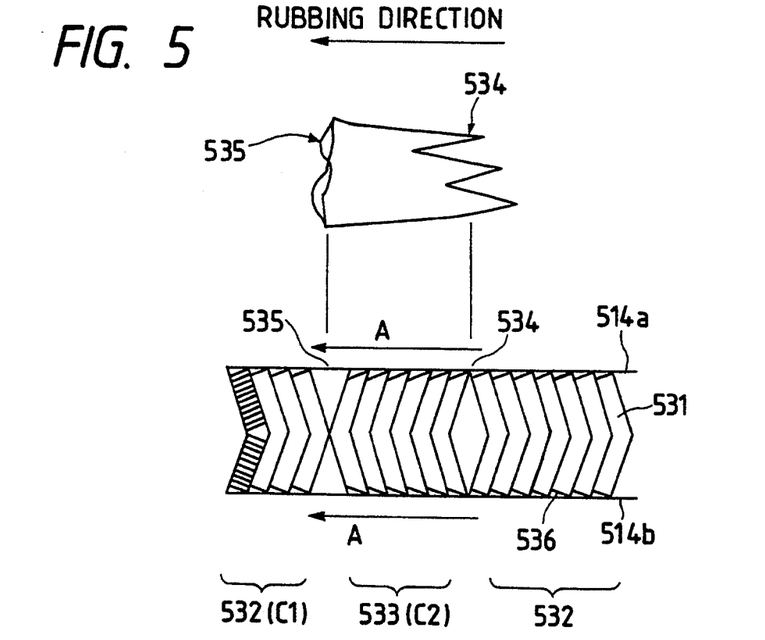
FIG. 5 is a schematic view showing the orientation state of liquid crystal molecules in the ferroelectric liquid crystal color-display panel of the present invention.

In the above-explained structure, a uniform orientation with satisfactory characteristics can be obtained by a combination of pre-tilting of liquid crystal on the surface of said orienting films 105, 105a and a particular liquid crystal. In the following there will be explained said orientation state and its model. Referring to FIG. 5, 536 indicates a liquid crystal on the interface, and each phase of liquid crystal is tilted with a directional angle corresponding to the rubbing direction. With respect to said tilting angle, the chevron structures are directed as indicated by 532 and 533, which are respectively called Sm*C1 and Sm*C2.

Boundaries 534, 535 of the chevrons of different tilting angles correspond to zigzag defects such as lightening defect or hairpin defect. The orientation employed in the present invention is the state Sm*C1 indicated by 532.

Figure 6:
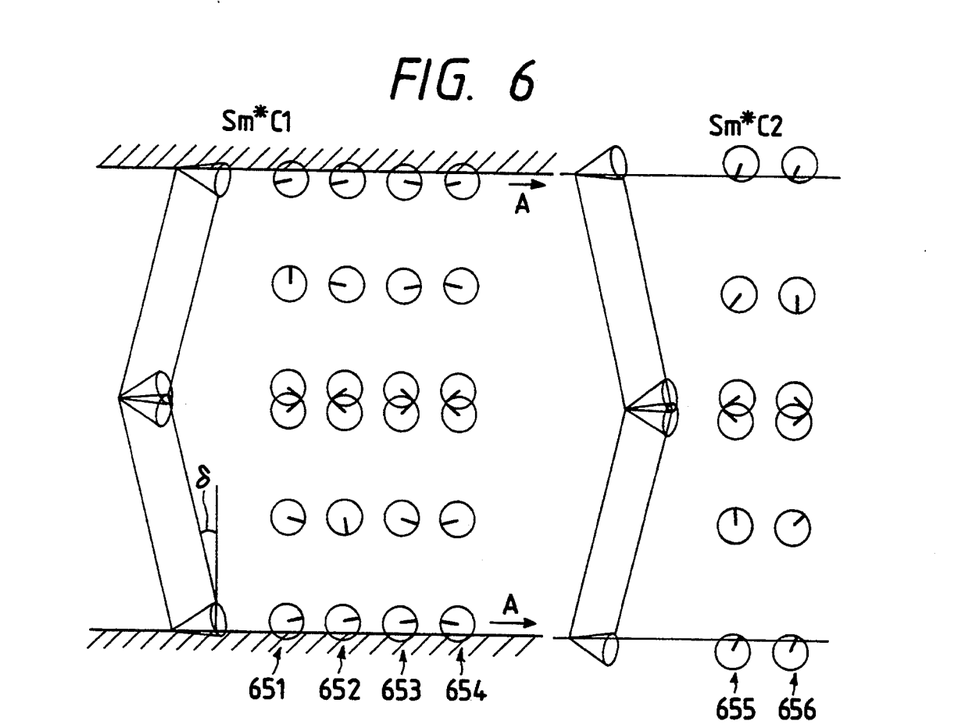
FIG. 6 is a schematic view showing C-directors in the orientation states shown in FIG. 5.

FIG. 6 shows C-directors in each of the states Sm*C1 and Sm*C2, wherein 651 and 652 indicate a twisted state of C1 orientation; 653 and 654 indicate a uniform state of C1 orientation; 655 and 656 indicate a twisted state of C2 orientation; and $\delta$ is the tilt angle of the layer. According to the investigation of the present inventors, a small pre-tilt angle causes the C2 orientation to be preferentially present, but an increase in the pre-tilting angle stabilizes the C1 orientation, whereby a uniform state as indicated by 653, 654 appears. However, an excessively large pre-tilting angle stabilizes the twisted state of C1 orientation as indicated by 651, 652, whereby the contrast used in the display is significantly deteriorated.

Figure 7A:
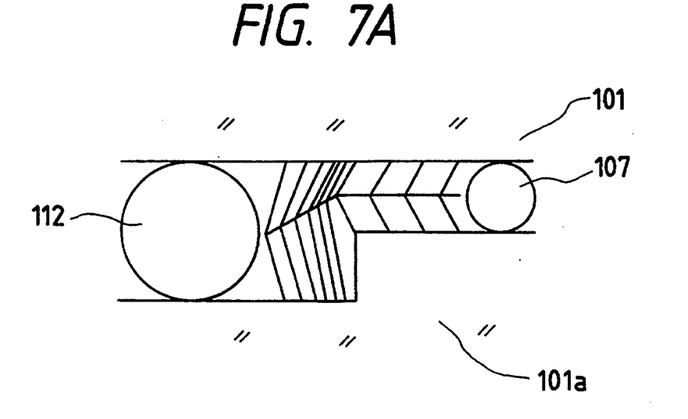
FIGS. 7A to 7C are schematic views showing defects in the chevron structure in the ferroelectric liquid crystal color-display panel of the present invention.
Figure 7B:
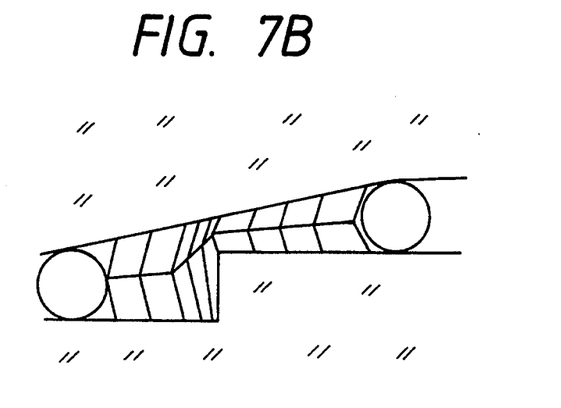
Figure 7C:
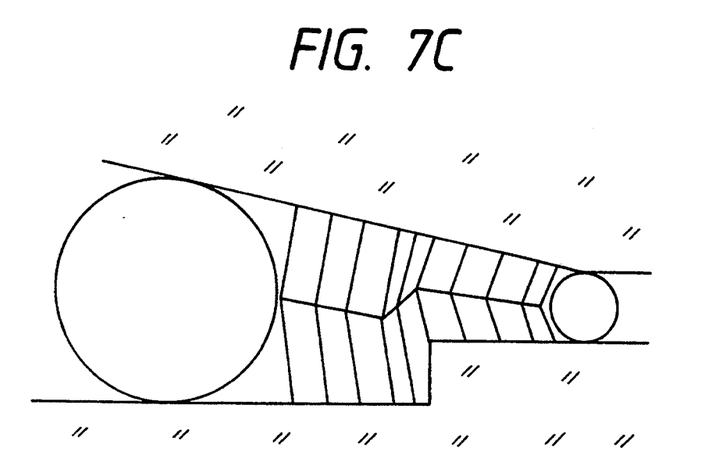

FIGS. 7A to 7C illustrate, the simplified models, the orientation states which the chevrons of ferroelectric liquid crystal can assume in the end portion of the effective area, when the substrates involve bending in the ferroelectric liquid crystal color-display panel employing ferroelectric liquid crystal of the above-mentioned chevron structure. FIG. 7A shows a representative state of the present invention, wherein the chevron structure of the ferroelectric liquid crystal assumes a substantially same structure from the interior of the pixel area to the vicinity of the stepped end portion. Said chevron structure is unstable, as it tends to decompose in a direction from said end portion to the side of the wider cell gap. Defects tend to be generated from such unstable structure, but the spreading of defects into the pixel area is practically limited to about 10 $\mu$m, and such defects can satisfactorily be concealed for example by the metal lead electrodes. In FIGS. 7B and 7C, the chevron structure in the pixel area shows continuous variation along the bending of the substrate. Because of said variation in the chevron structure in the pixel area and the decomposition of chevron structure at the end portion of pixel area toward the side with larger cell gap, the defects at cell driving tend to spread significantly. Besides, the change in the cell gap in the pixel area influences the state of electric field therein. Because of these two variations, the defects generated from the end portion of pixel area spread widely, eventually becoming as large as 5 mm.

The ferroelectric liquid crystal color-display device of the present invention, having different cell gaps n the pixel area and in the peripheral area, is featured by a fact that the diameter T (in average) of the gap-retaining material contained in the sealant in the peripheral area satisfies a relation:

$$t_1 + (t_2/2) \leq T$$

wherein $t_1$ is the cell gap (in average) of the pixel area, and $t_2$ is the thickness (in average) of the color filter. Ideally the diameter of the gap-retaining material in the sealant should be equal to the sum of the cell gap in the pixel area and the thickness of the color filter, but the above-mentioned relation of T, $t_1$ and $t_2$ is preferred in consideration of the particle size distribution of the gap-retaining material in the sealant and the tolerances of the cell gap in the pixel area and of the thickness of the color filter.

The present invention allows to form uniform cell gaps in the pixel area and in the peripheral area, by printing sealant, containing the gap-retaining material of the above-mentioned average diameter T, onto the substrate and adhering the upper and lower substrates.

This method allows to reduce the cell gap deficiency of about 1 $\mu$m, generated at the end portion of pixel area due to glass bending, to about 0.3 $\mu$m.

Then, said cell gap deficiency of about 0.3 $\mu$m, resulting from glass bending in a space between the sealed portion of the peripheral area and the pixel area, can be avoided by masked scattering of said gap-retaining material of the average diameter T in said space between the sealed portion of the peripheral area and the pixel area.

However, in a liquid crystal display device employing a complex pixel pattern for the purpose of enlarging the pixel area or of achieving high-speed drive, the masked scattering of the gap-retaining material in the above-mentioned space between the sealed portion of the peripheral area and the pixel area has limitation in the positional precision of scattering. Consequently, the prevention of bending of glass substrate can be more preferably attained by extending the color filter to the vicinity of the sealed portion in order to reduce said space between the sealed portion and the pixel area, providing said extended portion of the color filter with a gap-retaining material same as that used in the pixel area and providing the sealed portion with the above mentioned gap-retaining material of the average diameter T.

In the above-explained structure, the color filter in the pixel area is preferably extended to a distance of 1.2–5 mm, preferably 1.2–3 mm, from the sealed portion of the peripheral area. Defects in orientation tend to appear due to cell gap deficiency, if said distance exceeds 5 mm.

On the other hand, the distance between the sealed portion and the color filter is preferably 1.2 mm or larger, in consideration of process margins, such as a fluctuation of about 1 mm in the spreading of thermosetting epoxy resin contained in the sealant, at the adhesion of the substrates, and a fluctuation of about 0.2 mm in the exposure position of the photosensitive resin constituting the color filter.

The ferroelectric liquid crystal color-display device of the present invention, composed of a substrate which bears thereon a color filter formed by colored resin at least containing coloring substances in photosensitive resin and on which an area of pixel units is defined by surface electrodes and metal lead electrodes provided on said color filter, and another substrate on which an area of pixel units is defined by the other surface electrodes and metal lead electrodes provided thereon, said substrates being mutually adhered so as to for difference cell gaps in the pixel area and in the peripheral area, wherein the diameter T of the gap-retaining material contained in the sealant provided in the peripheral area satisfies a relation:

$$t_1 + (t_2/2) \leq T$$

in which $t_1$ is the cell gap in the pixel area and $t_2$ is the thickness of said color filter, allows to provide a uniform cell gap at least in the entire effective display area, thereby eliminating the bending of glass substrates and ensuring the satisfactory adhesion of the sealant.

In the following the present invention will be clarified further by embodiments thereof shown in the attached drawings.

EMBODIMENT 1

FIG. 1 is a partial cross-sectional view of an embodiment of the ferroelectric liquid crystal color-display device of the present invention, wherein shown are glass substrate 101, 101a; display electrodes 102, 102a; metal lead electrodes 103, 103a; insulation layers 104, 104a for preventing shortcircuiting between the upper and lower sides; orienting films 105, 105a; a liquid crystal layer 106; a gap-retaining material 107 in the pixel area; a passivation layer 108 constituting a protective film for the color filter; a color filter 109; a metal light-shield mask 110; a sealant 111; and a gap-retaining material 112 in the sealed portion. In the present embodiment, the diameter of said gap-retaining material 112 is selected equal to the sum of the diameter $t_1$ of the gap-retaining material in the pixel area and the thickness $t_2$ of the color filter. 115, 116 and 117 respectively indicate a pixel area, a peripheral area and an effective area.

In the present embodiment, there were employed the glass substrates 101, 101a of ferrosilicate glass plates of 1.1 mm in thickness; display electrodes 102, 102a of transparent ITO electrodes of 1500 Å in thickness; metal lead electrodes 103, 103a of molybdenum of 1500 Å in thickness; insulation layers 104, 104a of coated Ti-Si (1:1) insulation films of 1200 Å in thickness; orienting films 105, 105a for ferroelectric liquid crystal with a thickness of 200 Å; ferroelectric liquid crystal 106; gap-retaining material in the pixel area of SiO$_2$ heads with an average diameter of 1.3 μm; passivation layer 108 of polyamide of 1.5 μm in thickness; color filter 109 consisting of polyamide, containing dispersed pigment, of 1.6 μm in thickness; metal light-shield mask 110 of chromium of 1000 Å in thickness; sealant 111 composed principally of thermosetting epoxy resin; and gap-retaining material 112 in sealant of SiO$_2$ beads of an average particle size of 2.9 μm.

The ferroelectric liquid crystal color-display device thus formed could provide uniform cell gaps in the pixel area and in the peripheral area, due to the use of gap-retaining material of which diameter T (=2.9 μm) is equal to the sum of the diameter $t_1$ (=1.3 μm) of the gap-retaining material in the pixel area and the thickness $t_2$ (=1.6 μm) of the color filter. Thus the cell gap deficiency of about 1 μm, resulting from glass plate bending at the end portion of the pixel area, could be reduced to 0.3 μm, and the defects due to disrupted orientation could be considerably reduced.

EMBODIMENT 2

This embodiment employs, in the sealant, a gap-retaining material of a diameter equal to the sum of the cell gap of the pixel area and the thickness of the color filter as in the first embodiment, and additionally employs a gap-retaining material of a diameter same as that of the gap-retaining material in the sealant, in the space between the sealed portion of peripheral area and the pixel area.

Figure 2:
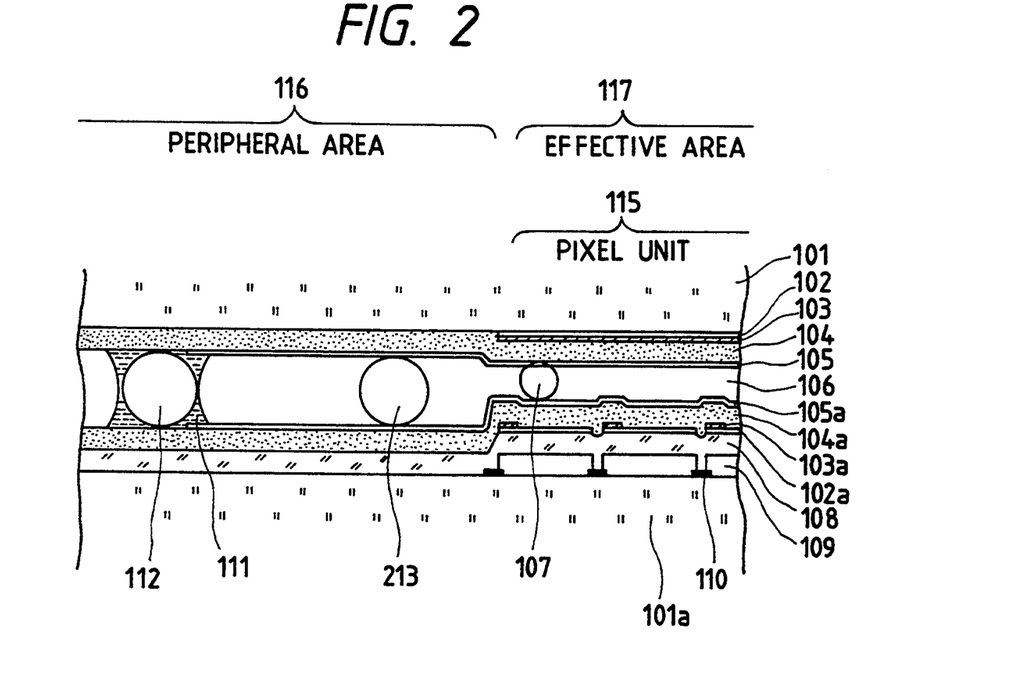
FIG. 2 is a schematic partial cross-sectional view of a second embodiment of the ferroelectric liquid crystal color-display panel of the present invention.

FIG. 2 is a partial cross-sectional view of the present embodiment, wherein components 101–112 and 115–117 are same as those in FIG. 1. A gap-retaining material 213 featuring the present invention has a same diameter as that of the gap-retaining material in the sealant and is provided, by masked scattering, in the space between the sealed portion and the pixel area.

Said scattering was conducted, before the adhesion of the upper and lower substrates, by placing the substrate bearing the color filter on an electrode stage of a gap-retaining material scattering apparatus and emitting the gap-retaining material with an electric charge of a polarity opposite to that of the electrode, thereby depositing the gap-retaining material onto the substrate. In this operation, the pixel area was masked whereby the gap-retaining material for the vicinity of the sealed portion could be provided in the space between the sealed portion and the pixel area.

The ferroelectric liquid crystal color-display device provided with the gap-retaining material in the space between the sealed portion and the pixel area was capable of suppressing the cell gap deficiency less than 0.3 μm at the end portion of the pixel area, whereby the defects in orientation resulting from the cell gap deficiency at such end portion could be avoided.

EMBODIMENT 3

Figure 3:
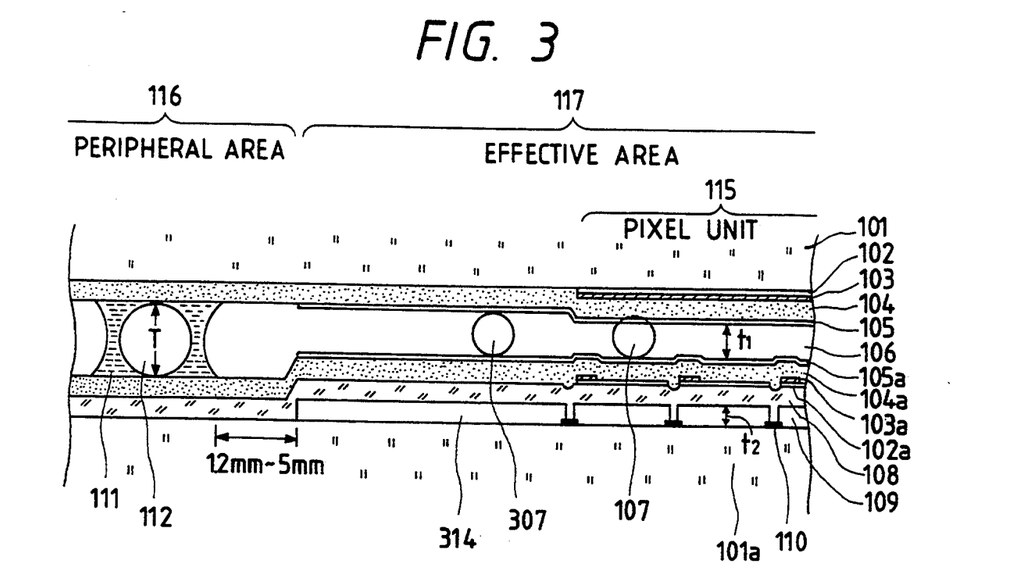
FIG. 3 is a schematic partial cross-sectional view of a third embodiment of the ferroelectric liquid crystal color-display panel of the present invention.

FIG. 3 is a partial cross-sectional view of another embodiment of the ferroelectric liquid crystal color-display device of the present invention, wherein there are provided glass substrates 101, 101a; display electrodes 102, 102a; metal lead electrodes 103; 103a; insulating layers 104, 104a for preventing shortcircuiting between the upper and lower substrates; orienting films 105, 105a; a liquid crystal layer 106; a pixel-area gap-retaining material 107; an effective-area gap-retaining material 307; a passivation layer 108 constituting a protective film for the color filter; a color filter 109; a metal light-shield mask 110; a sealant 111; and an in-sealant gap-retaining material 112. In the present embodiment, the diameter of the in-sealant gap-retaining material 112 is selected equal to the sum of the diameter $t_1$ of the pixel-area gap-retaining material and the thickness of the color filter. 314 indicates an extended portion of the color filter, formed so as to be in a distance of 1.2 to 5 mm from the sealed portion, in order to reduce the space between the sealed portion and the effective area having the color filter. Also 115, 116, and 117 respectively indicate a pixel area, a peripheral area, and an effective area in which said color filter is provided.

In the present embodiment there were employed the glass substrates 101, 101a composed of ferrosilicate glass plates of 1.1 mm in thickness; display electrodes 102, 102a of transparent ITO electrodes of 1500 Å in thickness; metal lead electrodes 103, 103a of molybdenum of 1500 Å in thickness; insulation layer 104 of coated Ti - Si (1:1) insulation film of 1200 Å in thickness; orienting films 105, 105a for ferroelectric liquid crystal of 200 Å in thickness; ferroelectric liquid crystal 106; pixel-area gap-retaining material 107 and effective-area gap-retaining material 307 of $SiO_2$ beads with an average particle size of 1.3 $\mu$m; passivation layer 108 of polyamide of 1.5 $\mu$m in thickness; color filter 109 of polyamide of 1.6 $\mu$m in thickness containing dispersed pigment therein; metal light-shield mask 110 of chromium of 1000 Å in thickness; sealant 111 principally composed of thermosetting epoxy resin; and in-sealant gap-retaining material 112 of $SiO_2$ beads with an average particle size of 2.9 $\mu$m.

The color filter could be obtained by patterning colored resin, containing a coloring substance in photosensitive resin, by a photolithographic process, and an exposure mask, designed to leave the colored resin in the pixel area, is so modified in the present embodiment as to leave the colored resin also in the space between the sealed portion and the pixel area, whereby the color filter could be extends to reduce said space.

In the ferroelectric liquid crystal color-display device thus formed, there could be obtained uniform cell gaps in the effective area and in the peripheral area by the use of in-sealant gap-retaining material of a diameter (2.9 $\mu$m) equal to the sum of the diameter (1.3 $\mu$m) of the pixel-area gap-retaining material and of the effective-area gap-retaining material and of the effective-area gap-retaining material and the thickness (1.6 $\mu$m) of the color filter. Thus the cell gap deficiency of 1 $\mu$m resulting from glass bending at the end portion of the effective area could be reduce to 0.3 $\mu$m, and said cell gap deficiency could be reduced further to less than 0.3 $\mu$m by extending the color filter to a position distanced by 1.2-5 mm from the sealed portion so as to reduce the space between the sealed portion and the effective area, whereby the defects in orientation resulting from the cell gap deficiency at the end portion of the effective area could be prevented.

EMBODIMENT 4

Figure 4:
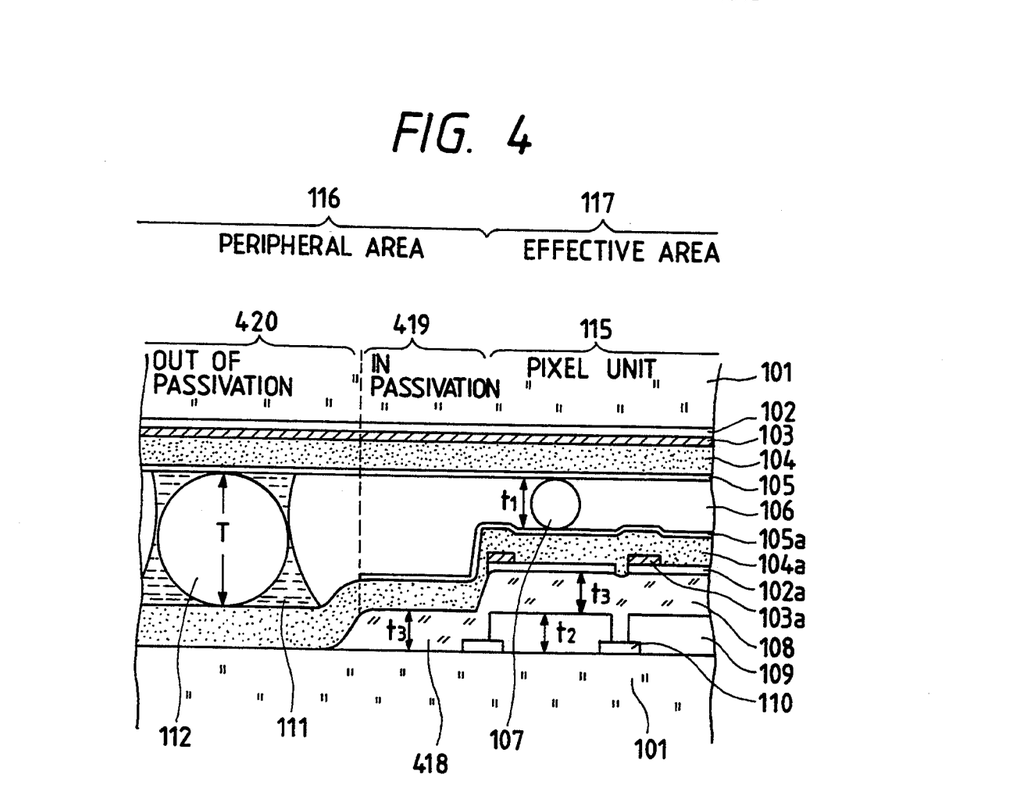
FIG. 4 is a schematic partial cross-sectional view of a fourth embodiment of the ferroelectric liquid crystal color-display panel of the present invention.

Now there will be explained an embodiment in which the passivation layer is printed only inside the printed portion of sealant, the diameter of the in-sealant gap-retaining material 112 is selected equal to the sum of the diameter $t_1$ of the pixel-area gap-retaining material 107, the thickness $t_2$ of the color filter 109 and the thickness $t_3$ of the passivation layer 108, and the passivation layer is given an extended portion reaching a distance of 1.2 to 1.5 mm from the sealed portion, thereby reducing the space between the sealed portion and said passivation layer.

FIG. 4 is a partial cross-sectional view of the ferroelectric liquid crystal color-display device of the present embodiment, wherein components 101-112 and 115-117 are same as those shown in FIG. 1. 418 indicates an extended portion of the passivation layer, reaching a position distanced by 1.2-1.5 mm from the sealed portion, in order to reduce the space between said sealed portion and said passivation layer, 419 indicates a passivation layer area where the passivation layer is present, and 420 indicates an external peripheral area where the passivation layer is absent.

The ferroelectric liquid crystal color-display device with thus formed cell gap could reduce the cell gap deficiency at the end portion of the pixel area to 0.3 $\mu$m or less, and could attain a high strength in the adhesion of the substrates constituting the cell.

As explained in the foregoing, the present invention allows to avoid significant bending of the glass substrate by including, in the sealed portion in the peripheral area, a gap-retaining material of which diameter T is in a particular relationship with the gap $t_1$ of the pixel area and the thickness $t_2$ of the color filter, and in particular is equal to the sum of said gap and said thickness. Besides the present invention allows to form a uniform cell gap at least in the entire effective display area, by extending the color filter to the vicinity of the sealed portion, more specifically to a position distanced by 1.2-5 mm from said sealed portion so as to reduce the space between said sealed portion and the effective area.

Thus there are obtained excellent effects of preventing the defects in orientation of liquid crystal at the end portion of the effective area, and providing a sharp image not only in the central portion of the pixel area but also in the peripheral portion thereof.

What is claimed is:

1. A liquid crystal color-display panel, comprising:
   a substrate which bears thereon a color filter having thereon a passivation layer, said passivation layer having thereon a first electrode:
   another substrate which bears thereon a second electrode intersecting the first electrode so as to form a pixel area at the intersecting area; and
   a liquid crystal being disposed between said substrates at a film thickness of 1-2 $\mu$m in said pixel area, wherein:
   said substrates are mutually adhered so as to form different cell gaps in said pixel area and in the peripheral area,
   the diameter T of a first gap-retaining material contained in sealant provided in the peripheral area satisfies a relationship:

$$t_1+(t_2/2) \leq T$$

in which $t_1$ is the cell gap of the pixel area and $t_2$ is the thickness of said color filter,
   a second gap-retaining material is provided in a space between said pixel area and a sealed portion of the peripheral area, and
   an edge portion of the color filter is extended to a position of a distance of 1.2-5 mm from a position at the sealed portion of the peripheral area.

2. A liquid crystal color-display panel according to claim 1, wherein a diameter of said second gap-retaining material is equal to the diameter T.

3. A liquid crystal color-display panel according to claim 1, wherein said T, $t_1$ and $t_2$ and the thickness $t_3$ of said passivation layer satisfy a relationship:

$$t_1+(t_2/2) \leq T \leq T_1+t_2+t_3.$$

4. A liquid crystal color-display panel according to claim 1, wherein T, $t_1$ and $t_2$ satisfy a relationship:

$$t_1+(t_2/2) \leq T \leq t_1+t_2.$$

5. A liquid crystal color-display panel according to claim 1, wherein said liquid crystal is a chiral smectic liquid crystal.

6. A liquid crystal color-display panel according to claim 1, comprising a plurality of said color filter and a mask in an area between adjoining color filters.

7. A liquid crystal color-display panel according to claim 6, wherein said mask is a metal film.

* * * * *

UNITED STATES PATENT AND TRADEMARK OFFICE
CERTIFICATE OF CORRECTION

PATENT NO. : 5,381,255

DATED : January 10, 1995

INVENTOR(S) : Kenji Ohnuma et al

It is certified that error appears in the above-indentified patent and that said Letters Patent is hereby corrected as shown below:

ON THE TITLE PAGE

At [56] References Cited

Under "FOREIGN PATENT DOCUMENTS"

"0010616  4/1989  Japan" should read
--0106016  4/1989  Japan--.

At [57] Abstract

Line 7, "gap retaining" should read --gap-retaining--.
Line 9, "$t_1+(t_2/2) \leq t$" should read --$t_1+(t_2/2) \leq T$--.

COLUMN 2

Line 27, "sho" should read --Sho--.

COLUMN 4

Line 35, "cellium" (both occurrences) should read --cerium--.

COLUMN 5

Line 16, "desiloxybenzylidene-" should read --decyloxybenzylidene- --.
Line 52, "the" (first occurrence) should read --in--.

UNITED STATES PATENT AND TRADEMARK OFFICE
CERTIFICATE OF CORRECTION

PATENT NO. : 5,381,255

DATED : January 10, 1995

INVENTOR(S) : Kenji Ohnuma et al

It is certified that error appears in the above-indentified patent and that said Letters Patent is hereby corrected as shown below:

COLUMN 6

Line 14, "n" should read --in--.

COLUMN 7

Line 18, "so as to for difference" should read --with different--.

COLUMN 9

Line 32, "extends" should read --extended--.
Line 43, "reduce" should read --reduced--.

COLUMN 10

Line 36, "electrode:" should read --electrode;--.

UNITED STATES PATENT AND TRADEMARK OFFICE
CERTIFICATE OF CORRECTION

PATENT NO. : 5,381,255
DATED : January 10, 1995
INVENTOR(S) : Kenji Ohnuma et al It is certified that error appears in the above-indentified patent and that said Letters Patent is hereby corrected as shown below:

<u>COLUMN 10</u> (cont'd.)

Line 67, "$t_1+(t_2/2) \leq T \leq T_1+t_2+t_3$." should read --$t_1+(t_2/2) \leq T \leq t_1+t_2+t_3$.--.

Signed and Sealed this

Thirtieth Day of May, 1995

Attest:

BRUCE LEHMAN

*Attesting Officer*     *Commissioner of Patents and Trademarks*